United States Patent [19]

Rosell

[11] Patent Number: 4,608,876
[45] Date of Patent: Sep. 2, 1986

[54] ASSISTED STEERING MECHANISM WITH RACK AND PINION

[75] Inventor: Jorge E. Rosell, Barcelona, Spain

[73] Assignee: Bendiberica S.A., Barcelona, Spain

[21] Appl. No.: 650,749

[22] Filed: Sep. 12, 1984

[30] Foreign Application Priority Data

Sep. 21, 1983 [ES] Spain ............................ 525776

[51] Int. Cl.[4] ............................ B62D 3/12; B62D 5/10
[52] U.S. Cl. ............................ 74/388 PS; 74/422; 74/498; 92/117 A; 92/136; 180/148; 180/158
[58] Field of Search ............................ 74/89.17, 422, 498, 74/388 PS; 92/117 R, 117 A, 136; 91/216 R; 180/148, 158

[56] References Cited

U.S. PATENT DOCUMENTS

| | | | |
|---|---|---|---|
| 3,347,109 | 10/1967 | Adams et al. | 74/388 |
| 4,141,432 | 2/1979 | Presley | 180/148 |
| 4,383,587 | 5/1983 | Lang | 180/148 |

FOREIGN PATENT DOCUMENTS

| | | | |
|---|---|---|---|
| 629640 | 10/1961 | Canada | 180/148 |
| 0077710 | 4/1983 | European Pat. Off. | |
| 1274434 | 9/1961 | France | |
| 2204168 | 5/1974 | France | |
| 2209899 | 7/1974 | France | |
| 2264700 | 10/1975 | France | |
| 81/00239 | 2/1981 | World Int. Prop. O. | |
| 484216 | 5/1938 | United Kingdom | 74/498 |
| 812207 | 4/1959 | United Kingdom | 180/148 |

Primary Examiner—Allan D. Herrmann
Attorney, Agent, or Firm—Larry J. Palguta; Ken C. Decker

[57] ABSTRACT

The cooperating double-acting piston/cylinder assistance assembly of the rack (20) incorporates a cylinder (24) firmly fixed to one end of the rack, in the extension of the latter and a stationary piston (40) fixed to one end of a hollow rod (42) whose other end (43) is fixed centrally in the steering casing (10), the hollow rod enclosing two separate fluid passages (45, 47) for supplying the chambers which are in opposition (46, 48), on each side of the piston (40), with actuating fluid under pressure coming from a distribution valve (30) mounted in the casing (10).

14 Claims, 6 Drawing Figures

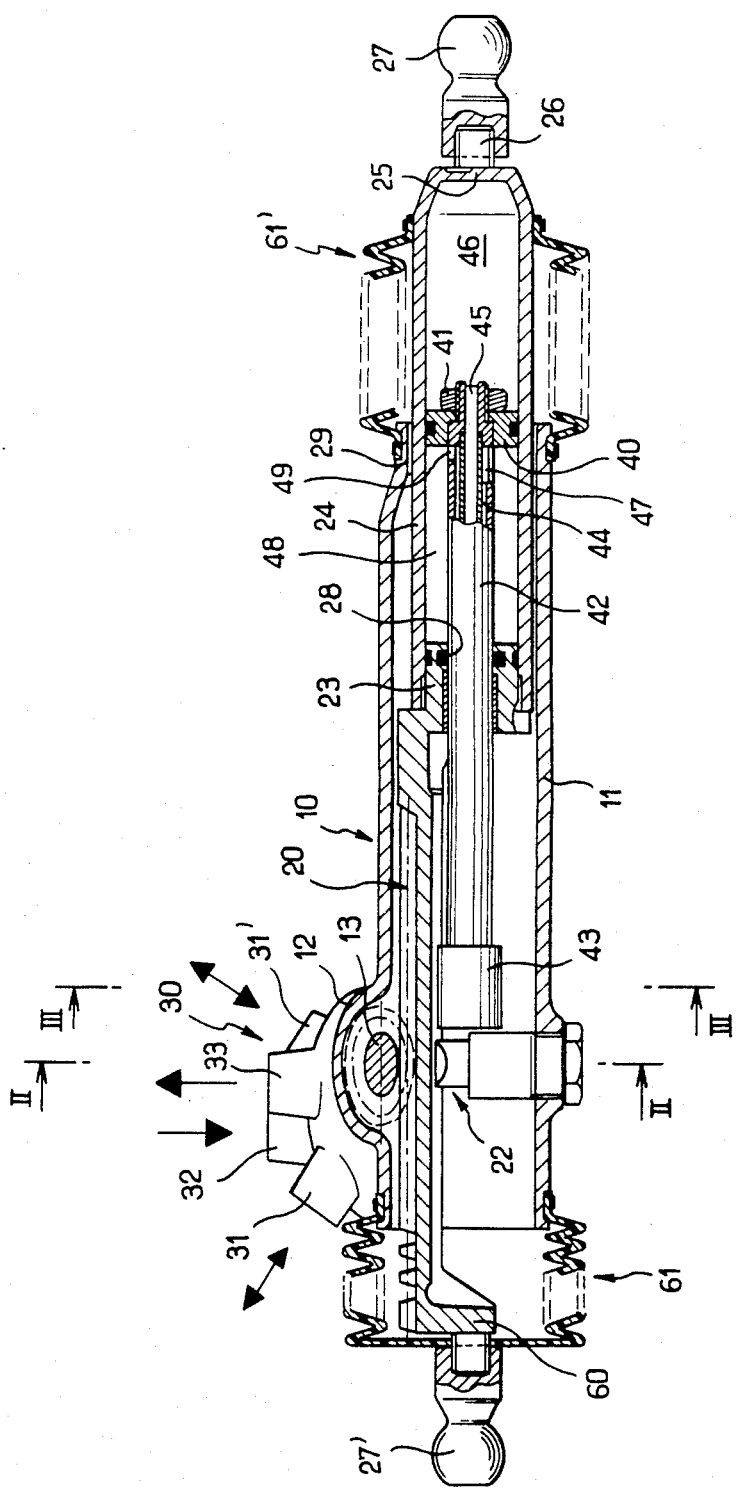
FIG_1

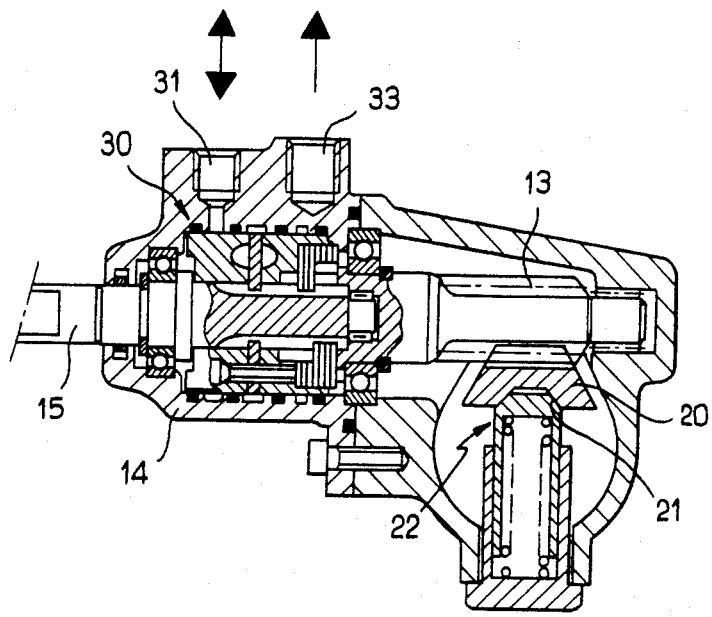
FIG_2
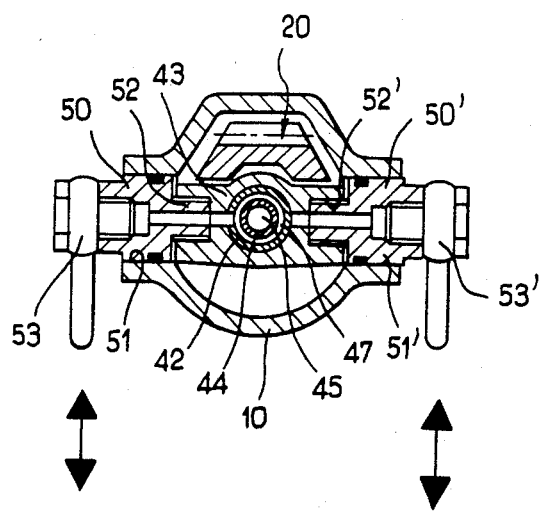
FIG_3

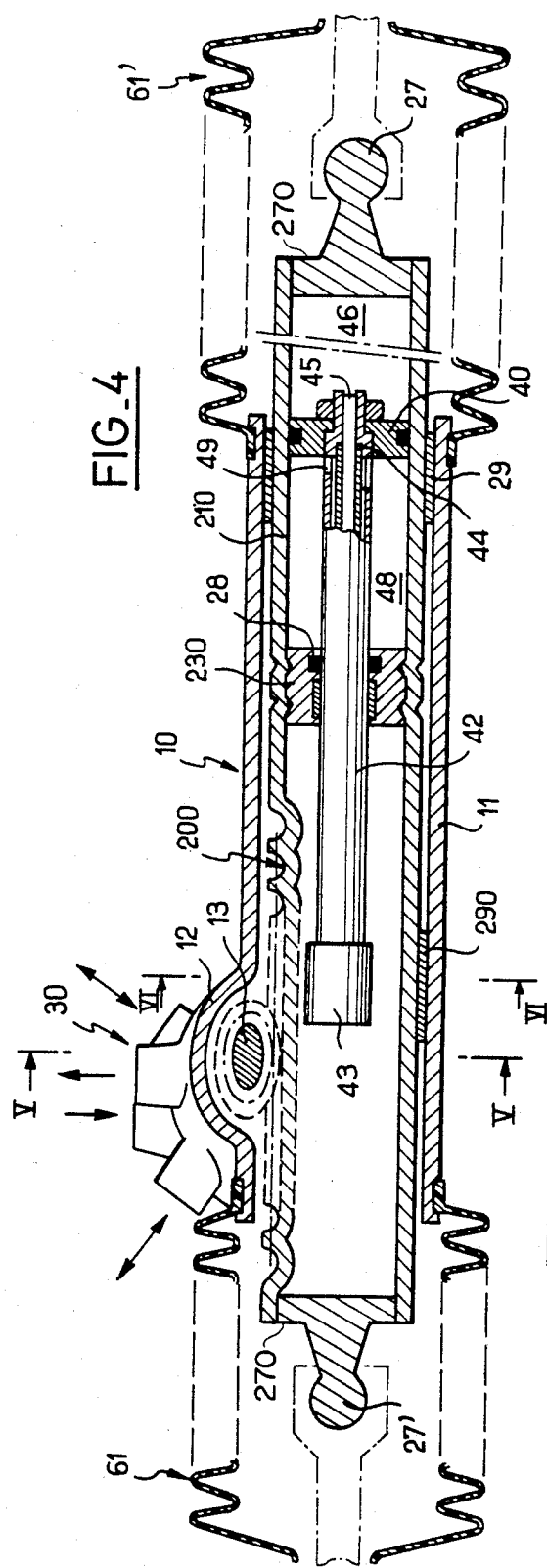
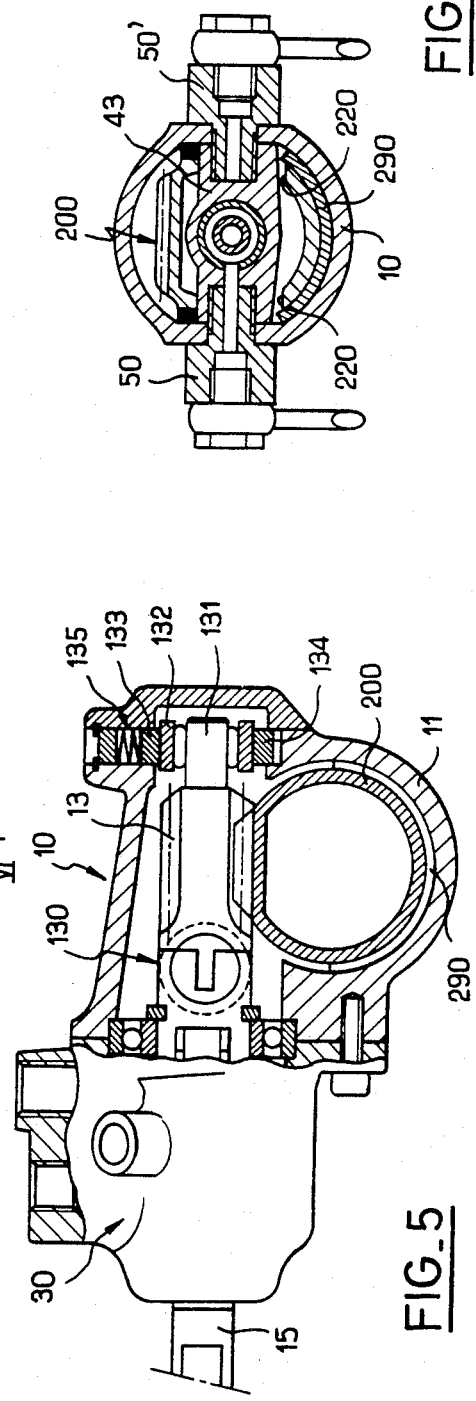

ASSISTED STEERING MECHANISM WITH RACK AND PINION

The present invention concerns assisted steering mechanisms for motor vehicles, and more particularly the assisted steering mechanisms with rack and pinion of the type incorporating a fixed steering casing in which is arranged a cooperating pinion/rack assembly, a pair of means for connecting the rack to a linkage for the steerable wheels of a vehicle, a cooperating double-acting piston/cylinder assembly joined to the rack, on one side of the casing, and incorporating pressure chambers which are in opposition on each side of the piston, and means for supplying selectively either one or the other of the chambers which are in opposition to the double-acting piston/cylinder assembly with fluid under pressure in order to assist the movement of the rack.

An assisted steering mechanism of this type is described in U.S. Pat. No. 3,347,109. The known assisted steering mechanisms of this type incorporate a stationary cylinder attached to the end of the steering casing, the piston being joined to the rack by a rod extending the rack and extending on both sides of the piston so as to slide and to be sealed relative to the opposite ends of the cylinder, the means for connecting the rack to the wheel linkage of the vehicle being provided firstly, at the end of the rack, and secondly, at the opposite end of the piston rod from the rack. The assisted steering mechanisms of this type have the disadvantages of great longitudinal length and of multiple sliding seal structures and external connections between the distribution valve means and the chambers of the piston/cylinder assembly.

The aim of the present invention is to propose an assisted steering mechanism of the type mentioned above, of simplified and robust construction and of compact configuration.

To achieve this, according to a characteristic of the invention, the piston of the piston/cylinder assembly is stationary, the cylinder being firmly fixed to a first end of the rack by lying in the extension of the latter and incorporates one of the means of the pair of means of connection to the linkage for the steerable wheels of the vehicle.

According to a more particular characteristic of the invention, the piston is firmly fixed to a first end of a fixed hollow rod lying in the casing and the second end of which is fixed to the casing, the said hollow rod incorporating advantageously two separate fluid passages opening on each side of the piston into the chambers which are in opposition of the moveable cylinder.

Other characteristics and advantages of the present invention will emerge from the following description of an embodiment, given by way of illustration but not limiting in any way, with reference to the accompanying drawings, in which:

FIG. 1 is a view in longitudinal section of an assisted steering mechanism according to the invention;

FIG. 2 is view in transverse section through the section plane II—II shown in FIG. 1;

FIG. 3 is a diagrammatic view in transverse section through the section plane III—III shown in FIG. 1; and FIG. 4 to 6 are similar views to those of FIGS. 1 to 3 showing another embodiment of the mechanism according to the invention.

In the description which follows and in the drawings, identical or similar components carry the same reference numbers, possibly bearing an additional distinguishing digit.

In the embodiment shown in FIGS. 1 to 3, the assisted steering mechanism according to the invention incorporates in the usual manner a steering casing 10 of general rectangular shape, advantageously made by casting and incorporating an end portion which is essentially tubular 11 and a central portion 12 in which is mounted so as to pivot a pinion 13 meshing with a rack structure 20 and to which is attached a body 14 of a rotary distribution valve 30 which is coaxial with the pinion 13 and actuated in sequence with the pinion 13, by an input component 15 intended to be coupled to a vehicle steering column.

The rack structure 20 has a general trapezoidal configuration, which may be seen particularly in FIGS. 2 and 3, with the teeth formed on the small side of the trapezium, the large side of the trapezium incorporating a longitudinal depression which is also trapezoidal 21 cooperating with the plunger of an elastic force component 22 mounted in the body 12 of the casing 10 and holding the teeth of the rack in mesh with the teeth of the pinion 13 while providing guidance in longitudinal sliding of the rack 20 in the casing 10.

The rack structure 20 incorporates at a first end a tubular extension 23 which is axially offset relative to the trapezoidal body of the rack so as to lie essentially coaxially with the tubular portion 11 of the steering casing 10. Mounted on the periphery of the tubular extension 23, screwed for example, is the open end of a cylinder structure 24 whose opposite end forming a bottom 25 incorporates means of connection such as 26 to a ball joint 27 intended to be joined to the linkage of a steerable wheel of the vehicle. In the cylinder 24 a piston 40 is situated firmly fixed, for example by a nut 41, to one end of a hollow piston rod 42 extending so as to slide and to be sealed through the bore of the tubular extension 23 of the rack structure 20, provided for this purpose with a sliding seal 28. The cylinder 24 is also guided relative to the tubular extension 11 of the casing 10 by a sliding bearing 29 formed at the end of this tubular extension 11 of the casing 10, the piston 40 being situated essentially in line with this sliding bearing 29.

The opposite end of the hollow rod 42 from the piston 40 is mounted in a central distribution block 43 which is firmly fixed to the casing body 10 as will be seen below. A central tube 44 lies inside the hollow rod 42, opening on the opposite side of the piston 40 from the hollow rod 42 and thus defining a passage 45 for supplying the cylinder chamber 46 situated between the piston 40 and the bottom 25 of the cylinder 24, and inside the hollow rod 42, an annular passage 47 communicating with the other annular chamber 48 of the cylinder 24 defined between the piston 40 and the tubular extension 23 of the rack 20 through an orifice 49 formed in the wall of the hollow rod 42, in the region of the piston 40.

As may be seen in FIG. 3 the block 43 has the configuration of a parallelepiped with a central blind bore in which the hollow rod 42 is housed, the block 43 being held in place in the casing 10 by a pair of ferrules 50, 50' incorporating cylindrical bodies which enter bores facing each other 51, 51' of the casing body 10 and threaded ends which enter capped holes facing away from each other 52, 52' formed in the opposite lateral walls of the block 43. The internal passage of the ferrule 50 communicates with the annular passage 47 through a passage formed in the block 43, and the internal passage of the ferrule 50' communicates with the central passage 45 through a passage also formed in the block 43, offset longitudinally from the previous passage. The ferrules 50 and 50' serve for mounting tubing connectors 53, 53' for connecting to the respective distribution openings 31, 31' of the distribution valve 30 also provided, conventionally, with an inlet opening 32 intended to be joined to a source of pressure and a return opening 33 intended to be joined to a reservoir. The opposite end of the rack body 20 from the piston 40 incorporates a transverse lug 60 carrying a ball-joint 27' for connecting to a link of the wheel linkage of the vehicle. When the input component 15 is actuated in either direction, and with it, the valve 30 and the pinion 13, the movement of the rack 20 under the effect of the rotation of the pinion 13 is assisted by the pressure admitted selectively by the valve 30 into the corresponding chamber 48 or 46 of the stationary piston assembly 40/moveable cylinder 24. As shown in FIG. 1, a protective bellows is advantageously provided between the ball-joint 27' and the adjacent end of the casing body 10, a similar protective bellows 61' being provided between the opposite end of the casing 11 and the cylinder 24. As shown in FIG. 2, the rotary distribution valve 30 is advantageously of the type with a star-type rotor and with C-springs such as that described in European Patent Application Eu No. 0,077,710 in the name of the applicant company.

The embodiment shown in FIGS. 4 to 6 differs essentially from the preceding embodiment in that the rack structure 200 is, in this case, formed from a tube which is forged locally to form the rack teeth, the moveable cylinder cooperating with the stationary piston 40 consisting of one end 210 of the rack tube, the ends of the tube being closed, so as to define in particular the cylinder chamber 46, by disc-shaped end walls 270 firmly fixed to the ball-joints 27 and 27'.

In this embodiment, the hollow rod 42 cooperates in sliding with an annular bulkhead 230 fixed inside the tube 210 and provided, like the tubular extension 23 of the preceding embodiment, with sliding seals 28. The tube 210 slides in the tubular extension 11 of the casing 10 by means of a sliding bearing 29 in the region of the piston 40, as before, and by means of a second sliding bearing 290 mounted in the casing 10 in line with the central block for distribution and for mounting 43. The rack tube 200 incorporates longitudinal openings opposite one another 220 through which the lateral zones of the block 43 pass, serving as connection to the ferrules 50, 50'. To overcome possible irregularities of the teeth of the rack 200, the pinion 13 is joined to the input component 15 by a universal joint 130 and its shaft 131 is mounted so as to pivot in a bearing ring 132 firmly fixed to an outer ring 133 mounted so as to be able to move laterally and radially in a housing which is essentially annular 134 of the casing 10, being pushed elastically into engagement with the teeth of the rack 200 by a spring 135.

Although the present invention has been described in relation to particular embodiments, it is not limited by them, but on the contrary, is capable of modifications and variants which will be apparent to a person versed in the art.

I claim:

1. A power steering mechanism, comprising
a stationary elongated hollow casing,
a rack body having one end, reciprocable within said casing and having teeth in meshing engagement with a driving pinion gear journaled within said mechanism and actuable by an input shaft member,
a fluid pressure power unit including a stationary piston fixedly connected to said casing by a hollow piston rod, and a cylinder member having an outer peripheral surface and fixedly connected to said one end of the rack body and extending in prolongation thereof, said piston delimitating within said cylinder member a pair of opposite pressure chambers, and
distribution valve means operable by said input shaft member to supply selectively fluid pressure to said pressure chambers,
wherein said hollow piston rod extends coaxially within a tubular part of said casing having one annular distal end, the outer peripheral surface of said cylinder member cooperating in sliding engagement with said distal end of the tubular part of said casing and the cylinder member having a closed end opposite said rack body provided with first output connecting means for connection to a steerable wheel, said rack body having a second end provided with second output connecting means for connection to a steerable wheel.

2. The mechanism of claim 1, wherein said piston is located substantially centrally of said distal end of said tubular part of said casing.

3. The mechanism of claim 2, wherein said hollow piston rod has one end opposite said piston fixedly connected to a mounting block having internal fluid passages and secured within said casing by at least one mounting element extending through a lateral wall of said casing and forming a fluid passage age for connection to said distribution valve means.

4. The mechanism of claim 3, wherein said mounting block is secured within said casing by an opposite pair of mounting elements.

5. The mechanism of claim 1, wherein said rack body has a rectilinear toothed central portion prolongated by a transversal end wing forming said second end and by a tubular end portion forming said one end and cooperating in sealing and sliding engagement with said piston rod.

6. The mechanism of claim 1, wherein said rack body comprises a tubular rack body, said cylinder member being formed integral with said tubular rack body.

7. The mechanism of claim 6, wherein said pinion gear is resiliently suppoted within said casing.

8. A power steering mechanism, comprising
a stationary elongated hollow casing,
a rack body having one end, reciprocable within said casing and having teeth in meshing engagement with a driving pinion gear journaled within said mechanism and actuable by an input shaft member,
a fluid pressure power unit including a stationary piston fixedly connected to said casing by a hollow piston rod, and a cylinder member having an outer peripheral surface and fixedly connected to said one end of the rack body and extending in prolongation thereof, said piston delimitating within said cylinder member a pair of opposite pressure chambers, and
distribution valve means operable by said input shaft member to supply selectively said pressure chambers with fluid pressure, wherein said hollow piston rod extends coaxially within a tubular part of said casing, said cylinder member having a closed end opposite said rack body provided with first output connecting means for connection to a steerable wheel, said rack body having a second end provided with second output connecting means for connection to a steerable wheel, and the rack body comprising a tubular rack body, the cylinder member consisting of an extension of the tubular rack body.

9. The mechanism of claim 8, wherein the pinion gear is mounted in the casing so as to hinge against an elastic component.

10. The mechanism of claim 8, wherein said piston is located substantially centrally of said distal end of said tubular part of said casing.

11. The mechanism of claim 10, wherein said hollow piston rod has one end opposite said piston fixedly connected to a mounting block having internal fluid passages and secured within said casing by at least one mounting element extending through a lateral wall of said casing and forming a fluid passage for connection to said distribution valve means.

12. The mechanism of claim 11, wherein said mounting block is secured within said casing by an opposite pair of mounting elements.

13. The mechanism of claim 8, wherein said rack body has a rectilinear toothed central portion and the cylinder member has a bulkhead, the bulkhead cooperating in sealing and sliding engagement with said piston rod.

14. The mechanism of claim 8, wherein said pinion gear is resiliently supported within said casing.

* * * * *